United States Patent [19]
Earle et al.

[11] 3,991,218
[45] Nov. 9, 1976

[54] PROCESS FOR TREATING FRESH MEATS
[75] Inventors: Roland D. Earle, Hollywood; D. H. McKee, Tampa, both of Fla.
[73] Assignee: Food Research, Inc., Tampa, Fla.
[22] Filed: Nov. 26, 1974
[21] Appl. No.: 527,404

[52] U.S. Cl. .............................. 426/250; 426/265; 426/303; 426/305
[51] Int. Cl.² .......................................... A23G 4/10
[58] Field of Search .......... 426/264, 265, 271, 305, 426/310, 250, 303

[56] References Cited
UNITED STATES PATENTS
3,395,024    7/1968    Earle .............................. 426/305 X

*Primary Examiner*—James R. Hoffman
*Attorney, Agent, or Firm*—Neil F. Markva

[57] ABSTRACT

The fresh meat product is encapsulated in a substantially continuous film composed of alginate material. An aqueous dispersion containing water-soluble algin is first applied to the surface of the fresh meat. Then an aqueous gelling solution is separately applied to the algin-coated meat surface to form said substantially continuous film. The film is sufficient to effectively prevent the growth of anaerobic and retard the growth of aerobic bacteria on the surface of the meat. The film is also effective to prevent dehydration and discoloration of the meat and bone thereby extending the shelf-life of the coated meat product. By evaporation, the coating of freshly slaughtered animal carcasses enhances the chilling from animal body temperature to the desired cooled storage temperature.

30 Claims, No Drawings

PROCESS FOR TREATING FRESH MEATS

BACKGROUND OF THE INVENTION

This invention relates to the treating of fresh meats to enhance handling and storage thereof from the slaughtering of the animal to the marketing of the retail meat product.

Centralized fabrication of carcasses into primal and subprimal cuts, packaging of these cuts and their distribution to the wholesale and retail outlets is rapidly becoming more popular in the meat packing industry. Centralization of fresh meat marketing and distribution has provided solutions to problem areas such as the shortage of skilled workers, the rising costs of equipment and transportation, decline in reliability of transportation, and intensified governmental regulations. However, microbial contamination resulting in the reduction of product shelf-life continues to be a significant problem. Further reduction in shrink and trim losses is also desirable.

Fresh meat provides an excellent medium for microbial growth. Initial contamination of the fresh meat is received because of the great amount of human contact and equipment exposure during slaughter, chilling, processing, transportation and retail displays. The time lapse between contamination from human and equipment exposure at the time of prefabrication at a centralized processing unit and the time of sale at the retail level allows for microbial multiplication and potential spoilage.

Thus, there is a long felt need in the meat packaging industry for reducing bacterial numbers and/or controlling their multiplication to avoid spoilage and to increase the subsequent retail shelf-life of meats. Microbial decontamination of fresh meats is also necessary to meet the impending microbial standards for meat products. These standards are set by the United States Government and are imminent as soon as acceptable levels of contamination are determined and rapid and reproduceable monitoring techniques can be established. Decontamination procedures are especially for the reduction of potentially hazardous organisms such as salmonella, which may have very low tolerances.

Another problem associated with the processing of meat is dehydration. The evaporation of moisture, or shrink, from carcasses during the initial chilling period after slaughter results in a one-and-one-half to three percent loss in carcass weight. Shrink continues to accumulate through the transportation and marketing channels. Such shrink costs the meat industry millions of dollars each year. Most of the loss is passed on to consumers in the form of higher prices.

The problems of shrink and microbial contamination are interrelated because attempts to control one problem often allows the other one to flourish. For example, increased air circulation and colder air during chilling retards microbial growth. However, this procedure increases shrink. Consequently, the industry has been seeking procedures for the reduction of both shrink and microbial growth with respect to the processing of meat products.

Under commercial conditions with good sanitation, it is not economically feasible to remove all sources of contamination or maintain perfect environmental conditions to retard microbial growth. To reduce the contamination to acceptable levels, various packaging procedures and decontamination techniques have been investigated.

The prior art has recommended the use of impermeable packages for prolonging the acceptability of meat products. For example, a vacuum has been used in combination with gas impermeable packaging. Soft film wraps such as polyvinyl chloride have been used to wrap sheep, hogs and beef to reduce shrinkage loss during shipment. However, the increased moisture on the surface of the meat wrapped with these films resulted in increased microbiological growth. An intermittent spray of a chlorine wash has been used in combination with the film wraps in an effort to reduce shrink and microbial contamination.

Chemical decontamination treatments including the application of chlorine, stannous chloride, hydrogen peroxide, and other weak acids have been used on lamb, pork, and beef carcasses. Ultraviolet light treatment has also been used to reduce the load of microorganisms but has increased fat oxidation. The other chemical treatments have been of limited value.

Numerous other techniques have also been tried but none have been able to effectuate the desired results of reducing shrink and at the same time eliminating microbial contamination. See U.S. Pat. Nos. 2,763,557, 2,819,975, 3,814,821 and 2,948,623 as typical prior art methods for treating meat products.

The processing of freshly slaughtered meat from body temperature to a desired cooled storage temperature poses several problems. The freshly slaughtered animal carcass is washed, hung, and must be cooled down from its body temperature which is about 104° F to a temperature just above freezing. The cooled storage temperature may be below 40° F. It is desired to eliminate the problem of the souring of the meat around the bone and the formation of crust on the surface of the meat. During the heat transfer process while the meat is being chilled, there is the problem of dehydration.

Throughout the meat processing industry, a cloth shroud soaked in brine is hand-wrapped around the carcass. Stainless steel pins are used to hold the salt water soaked cloth in place. The application of this cloth or shroud includes large expenditures with respect to labor and equipment and contamination problems due to handling. U.S. Pat. No. 2,697,664, 3,070,448, and 3,124,468 show various wrapping procedures which the present invention eliminates.

PURPOSE OF THE INVENTION

The primary object of the invention is to meet the long felt need in the meat packing industry of a treatment process whereby both the amount of shrink is reduced and microbial contamination is greatly reduced during the processing of fresh meat products.

Another object of the invention is to provide a process for treating fresh meat products so that enough oxygen is present to prevent the growth of anaerobic bacteria and simultaneously control the amount of oxygen to prevent a browning or discoloration effect.

A further object of this invention is to provide a thin continuous edible film that encapsulates and adheres directly to the meat surface.

A still further object of this invention is to provide a process for reducing microbial contamination of fresh meats by forming a thin film which effectively prevents the growth of anaerobic and retards the growth of aerobic bacteria.

Another object of this invention is to provide an adherent continuous film having an amount of water effectively providing an evaporating constituent that enhances chilling when placed on a freshly slaughtered animal carcass.

Another object of this invention is to provide an algin coating material in a continuous adherent film that has sufficient thickness to reduce the moisture loss of the meat over that normally experienced in the absence of the film to thereby maintain the bloom of the meat and enable handling of the coated meat product with minimal microbial contamination.

Still another object of this invention is to overcome the disadvantages associated with prior art techniques such as the elimination of additional wraps around chemically disposed films and the elimination of shrouds normally used in the meat packing industry.

SUMMARY OF THE INVENTION

These objects and other advantages are obtained when the fresh meat product is encapsulated in a substantially continuous, adherent film composed of alginate material. An aqueous dispersion containing water-soluble algin is first applied to the surface of the fresh meat. Then an aqueous gelling solution is separately applied to the algin-coated meat surface to form the desired film. Quite unexpectedly, this film has been found to effectively prevent the growth of anaerobic and retard the growth of aerobic bacteria on the surface of the meat. At the same time, the film has unexpectedly reduced dehydration of the meat product while enhancing the chilling of a freshly slaughtered carcass from its animal body temperature to the desired cooled storage temperature. Furthermore, the formation of the substantially continuous, adherent film of alginate material prevents the darkening of the bone and maintains the bloom of the meat surface.

The processing of freshly slaughtered meat from body temperature to desired cooled storage temperature includes moving the animal carcass along the path from the slaughtered area to a cooled storage area. The aqueous dispersion containing water-soluble algin is applied and gelled on the carcass surface at a location along this path. A substantially continuous film is formed over the entire surface of the animal carcass. The film has an amount of water effectively providing an evaporating constituent that enhances the desired chilling.

DESCRIPTION OF SPECIFIC EMBODIMENTS

The alginate coating composition for use in the process of this invention can be prepared by adding water-soluble algin to water. Any water-soluble algin that will gell with calcium salt such as sodium, potassium and ammonium salts of alginic acid may be used. Sodium alginate in its less degraded form; namely, the high viscosity grades, is generally used in the specific embodiments of this invention.

An edible filler material may be mixed with the algin. Examples of filler materials that have been used include carbohydrates comprising monosaccharides, polysaccharides and mixtures thereof. More specifically, dextrose, malto dextrin, sorbital or corn syrup solids may be used in this process. When using algin alone, the coating composition is prepared by adding water-soluble algin to pure drinking water at room temperature.

The water-soluble algin is added to the water until the resulting composition has a viscosity in the range of 350 to 5000 centipoises at room temperature. Filler materials may be used with the algin in an appropriate relationship from about 2 ½ to 20 parts by weight of the water-soluble algin to about 97 ½ to 80 parts by dry weight of the filler material. The mixture of algin and filler is then dissolved in a sufficient quantity of pure drinking water to produce an aqueous dispersion having a viscosity between 350 and 5000 centipoises at room temperature.

The viscosity of the aqueous dispersion is dependent upon the particular conditions under which the meat product is being treated. Freshly slaughtered animal carcasses are generally hung vertically. The aqueous dispersion is sprayed directly onto the surface of the animal which is at about the body temperature of the freshly slaughtered animal. The viscosity must be such that the aqueous dispersion will not drip. That is, the dispersion should maintain a substantially uniform coating until the solidified continuous film is formed by contact with the gelling solution. If the viscosity is too high, the resulting coating will be too thick and gummy. This latter condition represents a waste of valuable material without producing any further beneficial effects. It is specifically desired that the substantially continuous alginate film is effective to produce the results unexpectedly achieved in accordance with this invention.

Once the aqueous dispersion containing algin is applied to the meat surface, a gelling solution is then applied. The meat may be sprayed with or immersed in the gelling solution. The aqueous gelling solution contains a water soluble source of calcium ion such as calcium chloride, calcium gluconate, calcium acetate, calcium propionate, calcium lactate and the like. The aqueous gelling solution is applied for a period of time sufficient to form a substantially continuous film that adheres to the meat surface. The film should be strong enough to prevent cracking and breaking during subsequent handling and shipping operations.

The stronger the concentration of the calcium ion in solution, the quicker the alginate coating will be solidified and formed. For example, a suitable continuous film can be produced by using a 0.5 molar solution of calcium chloride being sprayed directly onto the aqueous dispersion that is uniformly disposed over the surface of the meat surface. Gelling time is reduced also by adding an edible gum or gumlike thickening agent to the calcium ion gelling solution. The thickening agents are in quantities sufficient to give the gelling composition a Brookfield viscosity of between 5 and 250 centipoises and more specifically 5 to 100 centipoises at room temperature. In accordance with this invention, a firm, strong alginate is formed almost instantaneously upon the application of the gelling solution to the aqueous dispersion.

A gelling solution used in a specific embodiment carried out in accordance with this invention includes the following composition:

| | |
|---|---:|
| carboxymethyl cellulose gum | 29.5 grams |
| pure drinking water | 3640.5 grams |
| calcium chloride | 304.5 grams |

The carboxymethyl cellulose has a medium viscosity and bears product No. 7MCF from the Hercules Powder Company. The calcium chloride bears product No. 4152 and is designated food grade by Mallinckrodt Chemical Company. The above gelling solution has a viscosity of about 20 centipoises at room temperature.

In one specific embodiment of this invention, the solids used in the aqueous dispersion range from 13 to 19 ounces per gallon of the dispersion. Where the surface of the meat is particularly fatty, it is necessary to use the dispersion at the higher viscosity level so that there will be a uniform adherence of the continuous film once it is gelled in the second processing step. The dispersion mixed under these conditions is usable in sanitary apparatus. These mixtures may easily be used in completely automated equipment used to first spray the aqueous dispersion on the hanging animal carcass followed by a second spraying of a gelling solution. The continuous film is formed on the animal carcass while it is at the body temperature of the freshly slaughtered animal. This temperature is generally about 104° F for most animals but may vary slightly as known in the prior art.

Cut meat products may be coated either in accordance with the spraying techniques described hereinabove or through an immersion technique. That is, the meat product may first be immersed in a bath of algin containing material. The meat product is then removed therefrom. Any excess should be removed. The algin-coated meat produt is then either sprayed or dipped into a gelling solution which may contain a calcium ion for solidifying the alginate material thereby encapsulating the meat product.

Coating substances used in the specific embodiments of this invention include 10 parts of sodium alginate with 90 parts malto dextrin. Sodium alginate is commercially available as Kelco Gel HV available from the Kelco Company, Clark, New Jersey. The malto dextrin is product Maltrin 10 of the Grain Processing Corporation, Muscatine, Iowa having a dextrose equivalent (DE) of 10–15. Ten to fourteen parts of the solid mixture is then dissolved in 86–90 parts by weight of pure drinking water at room temperature. Resultant aqueous coating dispersion has a viscosity of between 350 to 5000 centipoises at room temperature.

As indicated, the aqueous dispersion is first applied to the surface of the fresh meat. Then in a separate second step, an aqueous gelling solution is applied to the algin-coated meat surface for a period of time sufficient to form a substantially continuous film along the meat surface. This film includes up to about 87 percent water at the time it is first formed. Then as the film is maintained on the meat, the water evaporates from the film to a point below 30 percent by weight of the film. This evaporation of water from the film speeds up the chilling of the freshly slaughtered animal carcass. The entire operation of the formation of the substantially continuous, adherent alginate film takes place almost instantly.

This is important to maintain the speed of the product under normal plant conditions. The evaporation of the water from the continuous film is referred to as sacrificial moisture. That is, if the film were not on the surface of the animal carcass, the moisture would be evaporating directly from the animal carcass. While there is a movement of water from the animal carcass into the film when processing in accordance with this invention, the amount of weight loss due to dehydration is significantly reduced. For example, it has been found that on different animals there may be a one and one-half to three percent weight loss in the first 24 hours when chilling a freshly slaughtered animal to the desired cold storage temperature. It has been found that through the use of the alginate film of the present invention, that up to one-half of this loss may be saved thereby obtaining all the attendant advantages.

When coating various freshly slaughtered carcasses, it was found that on the beef there was about 1 ½ percent increase in total weight upon the initial formation of the algin film. When the water evaporates from the continuous film, there is less than 1/10 of one percent of additional weight on the carcass. The initial weight addition to hog carcasses is about 1 percent and to sheep it is about 1 ½ percent. After several days, the alginate film will become virtually dried and almost completely disappears.

On freshly slaughtered animals, the first 24 hours of chilling is very important. It is during this time that most of the evaporation of dehydration will take place. Another problem has been associated with a freshly slaughtered beef after it has reached its chilled temperature. It must be inspected for wholesomeness. The inspection process is referred to as a "ribbing" process. A cut is made into the backbone along a particular rib so that the loin is exposed. Grading of the meat is then effected by looking at the marbling in the exposed loin.

The prior art has attempted to protect the exposed meat in the rib eye because it oxidizes and shrinks away from the bone. Consequently, when the parts are delivered, it looks dark, dehydrated and the dehydrated portion must be trimmed causing additional weight loss. In accordance with the present invention, however, it is possible to coat the freshly cut surface of meat to prevent further oxidation, discoloration and shrinkage of the part. While the prior art has tried using a paper soaked with sugar and dextrose, this method has been found to be completely unsatisfactory because the protective material does not stay on the exposed meat surface.

In another controlled application of the invention, a hog carcass was split with the backbone being cut almost down to the end of the neck. One side of the split carcass including the split backbone was coated with an algin containing coating in accordance with this invention. The other half of the carcass was maintained as a control without a coating. After three days time, the coated side of the hog had a firm transition from the fat to the skin and a satisfactory color was maintained. On the other hand, the uncoated control became discolored after about two hours time and after three days there was such a significant amount of shrinkage that the skin pulled away from the fat. In addition, there was darkening of the bone which did not occur in the algin-coated side due to the oxidation of the hemoglobin.

In specific tests conducted on hanging freshly slaughtered animal parts, the parts were inoculated with anaerobic bacteria. The inoculated carcass was then treated with the two step coating process in accordance with this invention. Upon microbial examination of the coated inoculated carcasses after a controlled period of time, the anaerobic bacteria had not grown.

In another study, a culture of *Salmonella typhimurium* was spread uniformly over two separate test surfaces. One of the test surfaces was treated in accordance with the coating process of the present invention. The other set was an untreated control. After incubation for 24 hours at 35° C, the control plates had a count of 110,000,000 and the coated samples had a count of 18,000,000. This represents a difference of approximately 80 percent when comparing the samples coated in accordance with this invention and the untreated samples. Thus, there is a clear indication that the coating of a meat surface with an alginate film will inhibit the growth of aerobic bacteria.

Upon the discovery of the unexpected results associated with the continuous alginate film used in accordance with this invention, a specific theory has been developed. The primary sources of microorganisms found on a carcass after completion of the dressing operation are associated with air, hide, hair, the gut, excreations voided by the animal, stick knife evisceration, workman, workman's cloths, the wash water and equipment. The primary concern of the Federal Government is the problem of the growth of bacteria, both anaerobic and aerobic. The latter includes the contamination by bacteria which will cause such afflictions as botulism. When the alginate film of this invention is initially formed on the meat surface, it includes about 90 percent water. It is believed that any bacteria on the surface of the carcass will be picked up on the inside of the film. Any air-borne bacteria that hits the carcass after the formation of the film may enter the film from the outside. The unique advantage of this chemical film is that the amount of water in the film will be reduced to a point of less than 30% by weight. In this instance, the bacteria that has been contained or captured in the film either from the surface of the meat or from the air surrounding air will not be able to grow and will in fact be killed.

Another feature of the invention is the inclusion of various materials in the aqueous dispersion containing the water-soluble algin. The use of a bacteriacide such as chlorine will work to destroy any bacteria already on the meat product. It will also provide an additional preventative to the basic function of the algin-containing coating. There are inherent binder functions performed by the inclusion of starches such as potato starch and tapioca starch. The addition of flavoring and coloration materials to the dispersion enhance the taste and visual appearance of the meat product.

ADVANTAGES OF THE INVENTION

The treatment of meat products with the edible film processing of this invention eliminates the many disadvantages associated with various prior art processes. The elimination of cloth shrouds reduced handling and equipment costs and additionally reduces the possibility of microbial contamination. The use of polyvinyl chloride wraps has proven to be unsatisfactory due to the formation of bacterial slime and unsatisfactory surface condition on the meat products. The use of fat droplets or other chemical films requiring the application of hot compositions to the surface of the meat has been eliminated. This type of prior art process is particularly disadvantageous where chilling of a freshly slaughtered animal from its body temperature to a cooled storage temperature is desired.

The unexpected results associated with the process of this invention includes the prevention of growth of anaerobic and reduction of growth of aerobic bacteria. These results are unexpected especially in view of the further results of preventing dehydration which causes shrinkage of the skin. At the same time, the bloom of the meat is maintained and the darkening of the bone is prevented. A further unexpected result is associated with the enhanced chilling characteristics of the algin-containing film when it is used in conjunction with a freshly slaughtered animal carcass.

While the process for treating fresh meats has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A process for treating fresh meats for microbial contamination comprising:
   a. applying an aqueous dispersion containing water-soluble algin to the surface of the fresh meat, and then
   b. separately applying an aqueous gelling solution to the algin-coated meat surface to a period of time sufficient to form a substantially continuous edible film along the meat surface,
   c. said film being sufficient to effectively control the growth of bacteria on the surface of the meat.

2. A process as defined in claim 1 wherein said bacteria is an anaerobic bacteria.

3. A process as defined in claim 1 wherein said bacteria is an aerobic bacteria.

4. A process as defined in claim 1 wherein the film is sufficiently effective to retard air-borne bacteria from contaminating the meat.

5. A process as defined in claim 1 wherein said film is effective to prevent shrinkage of the meat and retard the oxidation of the meat to prevent the deleterious discoloration thereof.

6. A process as defined in claim 1 wherein said dispersion includes a bactericide.

7. A process as defined in claim 6 wherein said bactericide is chlorine.

8. A process as defined in claim 1 wherein said dispersion includes starches comprising potato starch or tapioca starch.

9. A process as defined in claim 1 wherein said aqueous dispersion includes flavoring materials and coloration materials.

10. A process for coating freshly cut meat surfaces comprising:
    a. preparing an aqueous dispersion containing water-soluble algin having a viscosity effective to substantially uniformly coat a meat surface,
    b. spraying the aqueous dispersion onto the surface of the meat, and
    c. separately applying an aqueous gelling solution to the algin-coated meat surface to form a substantially continuous film along the meat surface,
    d. said film being sufficient to effectively control the growth of a bacteria on the surface of the meat,
    e. said algin-coating material being present in an amount sufficient to form a film having sufficient thickness to reduce the moisture loss of the meat over that normally experienced in the absence of the film to thereby maintain the bloom of said meat,
    f. said film having an amount of water effectively providing an evaporating constituent that enhances the chilling of a freshly slaughtered animal carcass from the animal body temperature to the desired cooled storage temperature.

11. A process as defined in claim 10 wherein there is a sufficient amount of solids in each gallon of the dispersion to provide a viscosity of from about 350 to 5000 centipoises at room temperature.

12. A process as defined in claim 11 wherein the solids include sodium alginate.

13. A process for treating fresh meats for microbial contamination comprising:
   a. applying an aqueous dispersion containing water-soluble algin to the surface of the meat, and then
   b. in a separate step, applying an aqueous gelling solution to the algin-coated meat surface for a period of time sufficient to form a substantially continuous edible film along the meat surface,
   c. said film being sufficient to prevent the growth of anaerobic bacteria on the meat,
   d. said film being effective to retard the growth of aerobic bacteria on the meat.

14. A process as defined in claim 13 wherein said gelling solution is aqueous and includes a calcium ion.

15. A process as defined in claim 13 wherein each said separate applying step includes the spraying of the materials directly onto the surface of the meat.

16. A process as defined in claim 13 wherein said meat is a freshly slaughtered animal carcass being at about the body temperature of said animal, said continuous film being formed on the animal carcass while at said body temperature.

17. A process for controlling the growth of bacteria on meats comprising:
   a. applying an aqueous dispersion containing water-soluble algin to the surface of the meat, and then
   b. separately treating the algin-coated meat surface with an aqueous calcium ion-containing gelling solution for a period of time sufficient to solidify a substantially continuous film of the algin-containing coating material disposed along the meat surface,
   c. said algin coating material being present in an amount sufficient to form a film having sufficient thickness to reduce the moisture loss of the meat over that normally experienced in the absence of the film to thereby maintain the bloom of said meat.

18. A method of coating freshly cut meat surfaces comprising:
   a. providing a piece of meat having an exposed cut surface,
   b. applying an aqueous dispersion containing water-soluble algin to the freshly cut surface, and
   c. treating the algin-coated surface with an aqueous calcium ion-containing gelling solution for a period of time sufficient to form a substantially continuous film of the algin containing coating,
   d. said continuous film being sufficient to prohibit growth of anaerobic bacteria and being effective to retard dehydration and preserve bloom of the freshly cut meat surface.

19. A method as defined in claim 18 wherein the meat to which the aqueous dispersion is applied is at a temperature of about the body temperature of a freshly slaughtered animal.

20. A process for treating a freshly slaughtered animal carcass comprising:
   a. moving the animal carcass along a path from the slaughtering area to a cooled storage area,
   b. applying an aqueous dispersion containing water-soluble algin to the surface of the animal carcass at a location along said path, and
   c. treating the algin material on said surface with a gelling solution to form a substantially continuous film over the entire surface of the animal carcass,
   d. said film being effective to retard dehydration and preserve the bloom of the meat in the animal carcass,
   e. said film having an amount of water effectively providing an evaporating constituent that enhances the chilling of the animal carcass from the animal body temperature to the desired cooled storage temperature.

21. A process as defined in claim 20 wherein the aqueous dispersion is applied to the surface of the animal carcass at a temperature substantially equal to the body temperature of the freshly slaughtered animal.

22. A process as defined in claim 20 wherein the aqueous dispersion and the gelling solution are sprayed onto the surface of the animal carcass in separate spraying steps.

23. A process as defined in claim 20 wherein the temperature of the freshly slaughtered animal is about 104° and the temperature of the cooled storage area is just above a freezing temperature.

24. A process as defined in claim 20 wherein the film includes up to about 87 percent water at the time it is first formed and then with the water evaporating to a point below 30 percent by weight of the film.

25. A process for treating a freshly slaughtered animal carcass comprising:
   a. moving the animal carcass along a path from the slaughtering area to a cooled storage area,
   b. applying an aqueous dispersion containing water-soluble algin to the surface of the animal carcass at a location along said path, and
   c. applying a gelling solution to the algin-coated surface to form a substantially continuous film over the entire surface of the animal carcass,
   d. said film being effective to retard dehydration and preserve the bloom of the meat in the animal carcass,
   e. said substantially continuous film being sufficient to control the growth of bacteria on the surface of the meat product.

26. A process as defined in claim 25 wherein the temperature of the animal carcass is substantially equal to the body temperature of the freshly slaughtered animal while it is still in the slaughtering area, said aqueous dispersion and gelling solution being applied in separate steps while the animal carcass is at said animal body temperature, and said bacteria is anaerobic.

27. A process as defined in claim 25 wherein the animal carcass is at a temperature equal to substantially the body temperature of the freshly slaughtered animal while it is still in the slaughtering area, said aqueous dispersion and gelling solution being applied in separate steps while the animal carcass is at said animal body temperature, and said bacteria is both anaerobic and aerobic.

28. A process as defined in claim 25 wherein the temperature of the animal carcass is substantially equal to the body temperature of the freshly slaughtered animal while it is still in the slaughtering area, said aqueous dispersion and gelling solution being applied in separate steps while the animal carcass is at said animal body temperature, and said bacteria is aerobic.

29. A process as defined in claim 28 wherein said aerobic bacteria is salmonella.

30. A process as defined in claim 29 wherein said salmonella bacteria is salmonella typhimurium.

* * * * *